(12) United States Patent
Kennedy (10) Patent No.: US 9,533,342 B1
(45) Date of Patent: Jan. 3, 2017

(54) ROTOR ASSEMBLIES AND OTHER COMPOSITE STRUCTURES WITH ALIGNED BEARING SUPPORTS AND METHODS OF MANUFACTURE

(71) Applicant: The Boeing Company, Seal Beach, CA (US)

(72) Inventor: Dennis K. Kennedy, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 509 days.

(21) Appl. No.: 13/923,795

(22) Filed: Jun. 21, 2013

(51) Int. Cl.
  *B21D 53/78* (2006.01)

(52) U.S. Cl.
  CPC .................... *B21D 53/78* (2013.01)

(58) Field of Classification Search
  CPC ............... B21D 53/78; Y10T 29/49334; Y10T 29/49332; Y10T 29/49336; Y10T 29/49337; Y10T 29/4932
  See application file for complete search history.

(56) References Cited

U.S. PATENT DOCUMENTS 5,248,242 A * 9/1993 Lallo ..................... B29C 70/342
  156/156

* cited by examiner

*Primary Examiner* — Richard Chang
(74) *Attorney, Agent, or Firm* — DASCENZO Intellectual Property Law, P.C.

(57) ABSTRACT

Methods of co-curing aligned annular supports in a tubular region of a composite structure, such as a rotor blade, are disclosed. Methods include assembling an uncured composite structure by positioning an inboard annular support and an outboard annular support around an arbor, forming reinforcement fiber into a tubular region in contact with the supports, and applying a matrix material to the reinforcement fiber. The inboard and outboard annular supports are substantially composed of metal. Methods also include concentrically aligning the arbor and the supports along a common axis by applying heat to cause differential expansion of the arbor with respect to the supports, wherein the differential expansion causes an interference fit of the supports against the arbor. Methods also include curing the uncured composite structure to form the composite structure.

22 Claims, 7 Drawing Sheets

ROTOR ASSEMBLIES AND OTHER COMPOSITE STRUCTURES WITH ALIGNED BEARING SUPPORTS AND METHODS OF MANUFACTURE

This invention was made with Government support under Contract No. W911W6-07-D 0002-0020 awarded by the U.S. Army. The Government has certain rights in this invention.

FIELD

The present disclosure relates to rotor assemblies and other composite structures with aligned bearing supports.

BACKGROUND

Rotorcraft, such as helicopters, tiltrotors, and autogyros, have at least one rotor for providing lift force. These rotors typically have an engine that rotates a mast coupled to a hub, and at least two airfoil rotor blades coupled to the hub. Rotor blades may be detachably coupled, allowing a rotor blade to be removed for service and storage.

A helicopter typically has a main rotor, rotating substantially horizontally, that provides lift and thrust. The torque created by the rotation of the main rotor causes the fuselage of the helicopter to turn in the opposite direction. The most common mechanism to control undesired fuselage rotation is a tail rotor that provides sideways thrust to counteract the torque of the main rotor.

Rotor assemblies come in multiple varieties including fully-articulated, semi-rigid, and rigid types. These types differ in which blade motions may be controlled by the pilot of the rotorcraft. Blade flap motion is deflection perpendicular to the plane of rotation. Blade lag motion (also called lead-lag motion, drag motion and hunting) is deflection within the plane of rotation. Blade feather motion is a change of blade pitch with respect to the plane of rotation (blades may rotate about their longitudinal axis). Fully-articulated rotor assemblies allow each blade to independently flap, lag, and feather. Semi-rigid rotor assemblies (also called semi-articulated rotors) lack independent flap and lag hinges, allowing only coordinated flap motion and independent feathering motion. In a semi-rigid rotor assembly, the blades are rigidly attached to each other. The assembly flaps as a unit; when one blade flaps up, another flaps down. A two-bladed semi-rigid rotor may be referred to as a teetering rotor or a see-saw rotor. If a semi-rigid rotor has three or more blades, it may be referred to as a gimbaled rotor. Rigid rotor assemblies lack any flap or lag hinges (and are sometimes called hingeless rotors). The blades, hub, and mast are rigidly attached to each other. Though other components are rigidly connected, rigid rotors may include feathering control of the rotor blades.

Feathering occurs by changing the pitch of the blades relative to the plane of rotation. A pitch bearing is typically incorporated into the rotor assembly to ease the blade feather motion. Feather may be collective (all blades set to the same pitch), allowing modulation of the magnitude of the rotor thrust, or may be cyclic (blade pitch depends on azimuth position), allowing modulation of the direction of the rotor thrust. A pilot can control the pitch and roll of a rotorcraft by appropriate cyclic feathering of the main rotor blades. When a tail rotor is employed, a pilot can control the yaw of a rotorcraft by appropriate collective feathering of the tail rotor blades.

Rotor blades experience substantial dynamic forces. Therefore, the blades and any hinges, bearings or couplings must be precisely engineered to provide acceptable stability, control, and performance.

SUMMARY

Composite structures created according to the present disclosure are precision rotor blades, or portions thereof, with replaceable pitch bearings. The resulting composite structures have at least two annular bearing supports, an inboard bearing support and an outboard bearing support, sufficiently aligned to allow for installation and removal of pitch bearings within the composite structure without damage to the supports. Composite structures may be manufactured by assembling the discrete supports and a composite material around an arbor, concentrically aligning the arbor and the supports along a common axis, and curing the uncured composite structure. Assembling the uncured composite structure involves positioning the at least two supports around the arbor, forming reinforcement fiber into a tubular region in contact with the at least two supports, and applying a matrix material to the reinforcement fiber. Concentrically aligning the arbor and the supports involves adjusting the temperature of one or more of the arbor and the supports such that the arbor differentially expands relative to the supports until the arbor and the supports form an interference fit. For example, the arbor may be heated to cause differential expansion of the arbor. Curing involves changing the uncured, generally malleable, composite structure into a generally rigid structure by the application of one or more curing agents, such as chemical compounds, heat, pressure, light, and other forms of energy. Where curing involves heating the structure, the arbor and the supports may be selected such that the applied heat consequently aligns the arbor and the supports. For example, the arbor may have a coefficient of thermal expansion sufficiently greater than that of the supports to allow the applied heat of curing to expand the arbor into an interference fit with each support.

DESCRIPTION

Figures 1, 2:
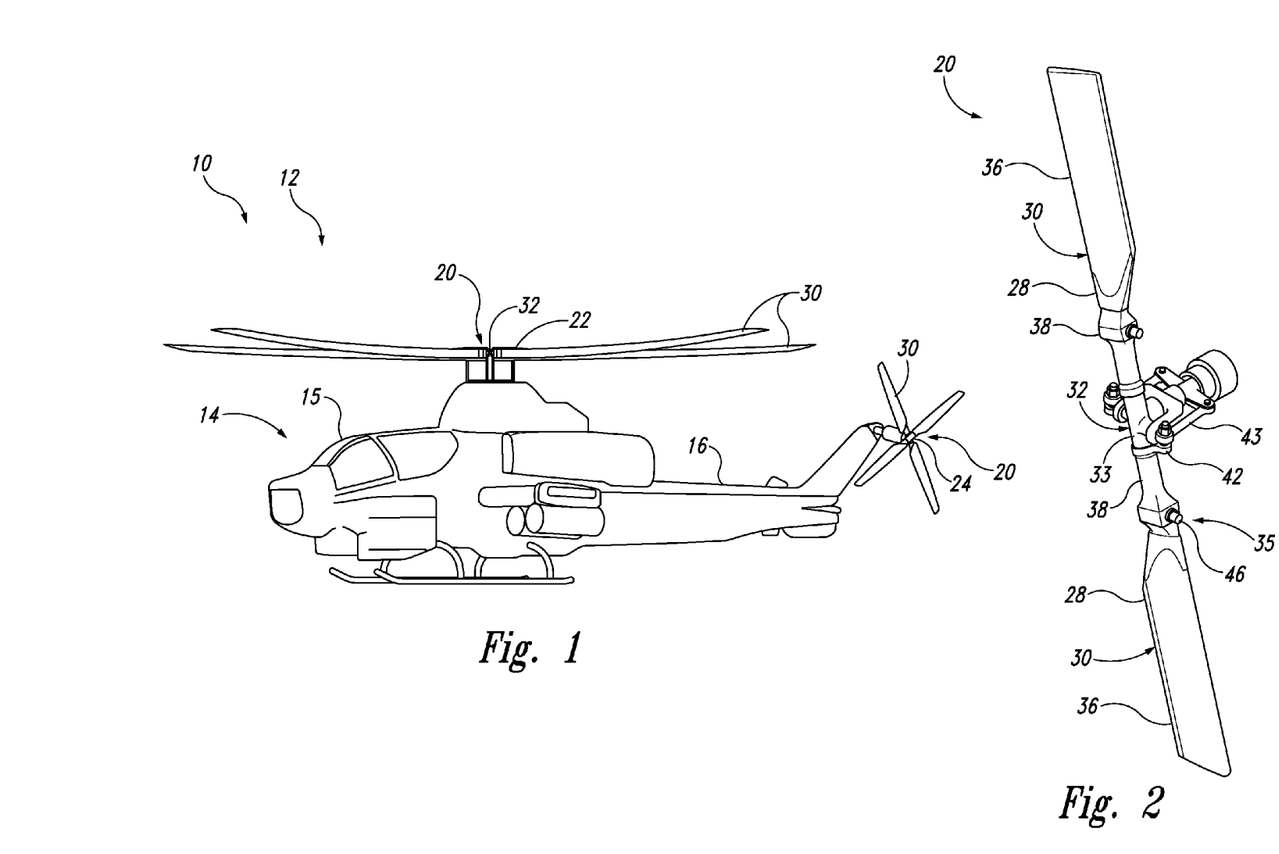
FIG. 1 is a drawing of an illustrative, non-exclusive example rotorcraft.
FIG. 2 is a drawing of an illustrative, non-exclusive example rotor assembly.
Figure 3:
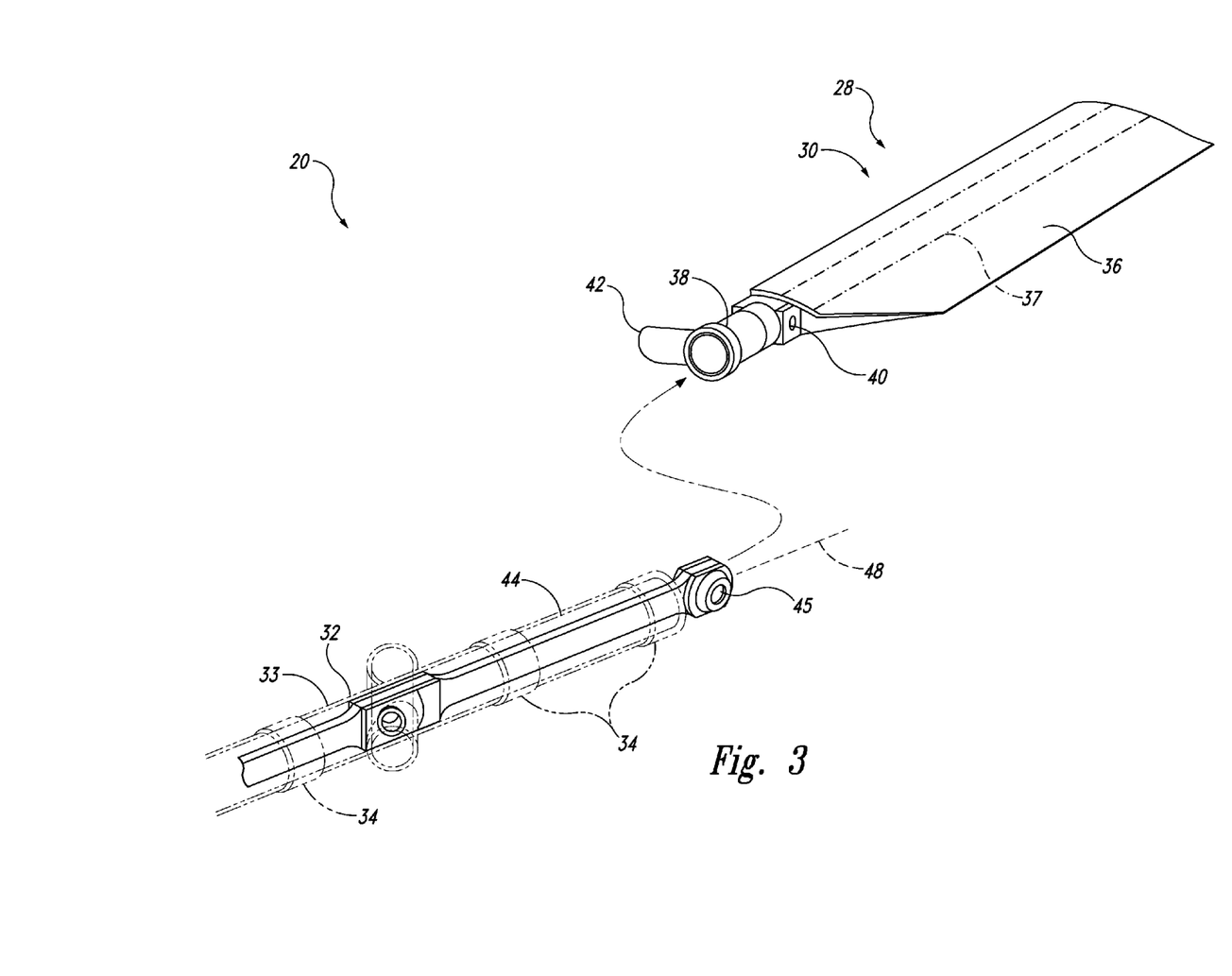
FIG. 3 is an exploded view of an illustrative, non-exclusive example rotor assembly.

FIGS. 1-3 depict illustrative, non-exclusive examples of rotor assemblies 20 and other composite structures with aligned bearing supports. FIG. 1 depicts an illustrative, non-exclusive example rotorcraft 10, a helicopter 12. Helicopter 12 includes a fuselage 14 having a forward section 15 and a tail boom section 16, and two rotor assemblies 20. Main rotor assembly 22 is operatively coupled to fuselage 14 and includes at least one rotor blade 30. Tail rotor assembly 24 is operatively coupled to tail boom section 16 and includes at least one rotor blade 30. Rotor blades 30 may be detachably coupled to rotor hub 32, allowing rotor blades 30 to be removed for service and/or storage. In FIG. 1, each of the main rotor assembly 22 and the tail rotor assembly 24 is depicted with four rotor blades 30. Rotor assemblies 20 may have one, two, three, four, five, or more rotor blades 30.

As shown in FIGS. 2-3, an illustrative, non-exclusive example rotor assembly 20 comprises a rotor hub 32, including a trunnion 33 having at least one pitch bearing journal 34. A journal is a region of a shaft or other machine part that supports the bearing surface of a bearing. Rotor assembly 20 also comprises at least one composite structure 28 associated with a rotor blade 30. The composite structure may be at least a portion of, optionally all of, a rotor blade root fitting 38, a rotor blade spar 37, or the rotor blade 30. Rotor blade 30 may include an airfoil 36, a spar 37, and a root fitting 38. Rotor blade 30 is configured to tightly fit over trunnion 33 with a tubular section that at least partially includes the root fitting 38. Additionally or alternatively, root fitting 38 covers trunnion 33 thereby maintaining the aerodynamic contour of rotor blade 30. Rotor blade 30 is detachably connected to rotor hub 32 and is retained on rotor hub 32 by a retention mechanism 35. Illustrative, non-exclusive example retention mechanisms 35 include a retention strap 44 coupled to rotor hub 32 and a fastener 46 which couples rotor blade 30 to the retention strap 44. Fastener 46 may be a bolt, a lug, a pin, or other similar mechanism which passes through a retention aperture 40 in the rotor blade 30 and a strap aperture 45 in the retention strap 44.

When rotor blade 30 is coupled with rotor hub 32, each pitch bearing journal 34 of trunnion 33 is covered by root fitting 38 of rotor blade 30. Pitch bearing journal 34 engages root fitting 38 in a manner to permit movement of rotor blade 30 relative to rotor hub 32 about a feathering axis 48 (sometimes referred to as a blade pitch change axis), which runs longitudinally along spar 37 and generally longitudinally along rotor blade 30. Feathering control may be assisted by a pitch horn 42, a component of or rigidly coupled to rotor blade 30, and by a feathering control link mechanism 43 (sometimes referred to as a pitch control link mechanism) operatively coupled to pitch horn 42. Additionally or alternatively, root fitting 38 is sufficiently torsionally stiff to function as a component of the feathering mechanism, transmitting pitching torque from feathering control link mechanism 43 into rotor blade 30.

Figure 4:
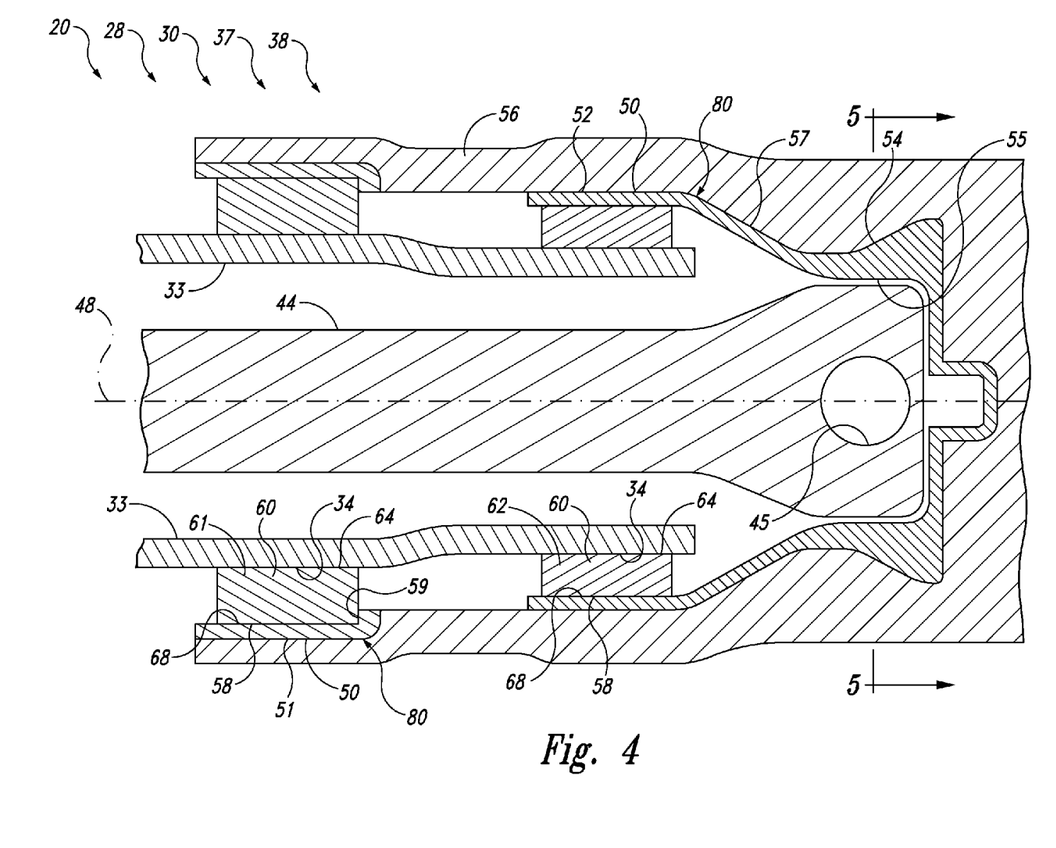
FIG. 4 is a cross sectional, fragmentary view of an illustrative, non-exclusive example of a rotor assembly including an illustrative, non-exclusive composite structure.

FIG. 4 depicts a cross sectional view of a portion of an illustrative, non-exclusive example rotor hub 32 in receipt of rotor blade 30. Each pitch bearing journal 34 of trunnion 33 encircles trunnion 33 and faces radially outward. Rotor blade 30 may include at least two, spaced apart, bearing supports 50. Rotor blade 30 may include at least two detachable pitch bearings 60 in contact with the radially inward side of one or more bearing supports 50. Pitch bearings 60, when present, are fit on the radially inward side of the one or more bearing supports 50. The pitch bearing 60 nearest the center of rotor hub 32 may be referred to as the inboard pitch bearing 61. The pitch bearing 60 farthest from the center of rotor hub 32 may be referred to as the outboard pitch bearing 62. The bearing support 50 which supports the inboard pitch bearing 61 may be referred to as the inboard bearing support 51. The bearing support 50 which supports the outboard pitch bearing 62 may be referred to as the outboard bearing support 52.

Pitch bearings 60 are typically annular and include a bearing surface 64 facing radially inward and an outer surface 68 facing radially outward. When rotor blade 30 is assembled on rotor assembly 20, bearing surface 64 is in contact with pitch bearing journal 34. To allow forces to transfer efficiently from rotor blade 30 to rotor hub 32, especially dynamic loads encountered during hub rotation, pitch bearings 60 should fit over bearing journals 34 with a close tolerance, slip fit. This close fit minimizes uncontrolled loads, motions, and vibrations. When employing two or more pitch bearings 60, all bearings must be concentrically aligned along a common axis, typically the feathering axis 48, to achieve the desired close fit. Typically, bearing surface 64 is generally cylindrical, optionally substantially cylindrical, and may be frusto-conical. Bearing surface 64 may have substantially no taper, or draft, e.g., the draft angle may be less than 0.5°, less than 0.3°, less than 0.2°, or less than 0.1°. When bearing surface 64 does have a taper, the draft angle may be about 0.5°, about 1°, about 1.5°, about 2°, about 3°, or about 5°.

Pitch bearings 60 may be a monolithic component, such as a bushing, or may be composed of multiple components (and hence may be described as a bearing assembly), including, for example, roller bearing assemblies, ball bearing assemblies, and/or needle bearing assemblies. Pitch bearings 60 may be substantially composed of relatively rigid materials such as metal (e.g., steel, aluminum alloy, magnesium alloy, and/or titanium alloy), plastic, and/or fiber reinforced synthetic material. Bearing surface 64 and/or pitch bearing journal 34 may be composed of a low friction material and/or may include an anti-friction coating. Coatings may include a liquid or may be dry. Illustrative, non-exclusive example anti-friction coatings may include one or more of PTFE (polytetrafluoroethylene), graphite, molybdenum disulfide, grease, and oil.

Pitch bearings 60 may be detachably secured in contact with bearing supports 50 such that pitch bearings 60 may be removed and replaced. Illustrative, non-exclusive securing mechanisms include adhesive, a retainer ring, a clip, and a spring. Specifically, pitch bearings 60 may be removed from the rotor blade 30 and replaced with different pitch bearings 60 without damaging the bearing supports 50. In some embodiments, pitch bearings 60 may be removed and replaced in the field, i.e., without the use of heavy machinery or machine cutting operations (e.g., line boring).

Bearing supports 50 are generally annular and support pitch bearings 60 within root fitting 38 of rotor blade 30. Bearing supports 50 include an inner surface 58, facing radially inward, that contacts outer surfaces 68 of pitch bearings 60 when pitch bearings 60 are installed. Bearing supports may include a bearing locator 59, a feature that aligns an installed pitch bearing 60 along the feathering axis 48. As with alignment of multiple pitch bearings 60, multiple bearing supports 50 may be concentric and aligned along a common axis, typically the feathering axis 48. Such an arrangement is useful where tight tolerances and close fit pitch bearings 60 are employed. Bearing supports 50 may be substantially composed of relatively rigid materials such as metal (e.g., steel, aluminum alloy, magnesium alloy, and/or titanium alloy), plastic, and/or fiber reinforced synthetic material.

Inner surfaces 58 of bearing supports 50 are configured to receive outer surfaces 68 of pitch bearings 60. Typically, inner surface 58 is generally cylindrical, optionally substantially cylindrical, and may be frusto-conical. Inner surface 58 may have substantially no taper, or draft, e.g., the draft angle may be less than 0.5°, less than 0.3°, less than 0.2°, or less than 0.1°. When inner surface 58 does have a taper, the draft angle may be about 0.5°, about 1°, about 1.5°, about 2°, about 3°, or about 5°. Outer surfaces 68 of pitch bearings 60 typically take the same form as corresponding inner surfaces 58 of bearing supports 50, i.e., an outer surface 68 is typically substantially cylindrical if mating inner surface 58 is substantially cylindrical.

Composite structure 28 is composed of several components, including bearing supports 50 and a composite material 56. Composite structure 28 may be substantially composed of composite material 56. Additionally or alternatively, composite material 56 may form the outer surface of composite structure 28. Composite material 56 may include a matrix material (such as a thermoset, thermoplastic, and/or a resin), and may be reinforced with surface and/or embedded fiber. For example, composite material 56 may include a matrix material reinforced with at least one of glass fiber, carbon fiber, and aramid fiber.

Figure 5:
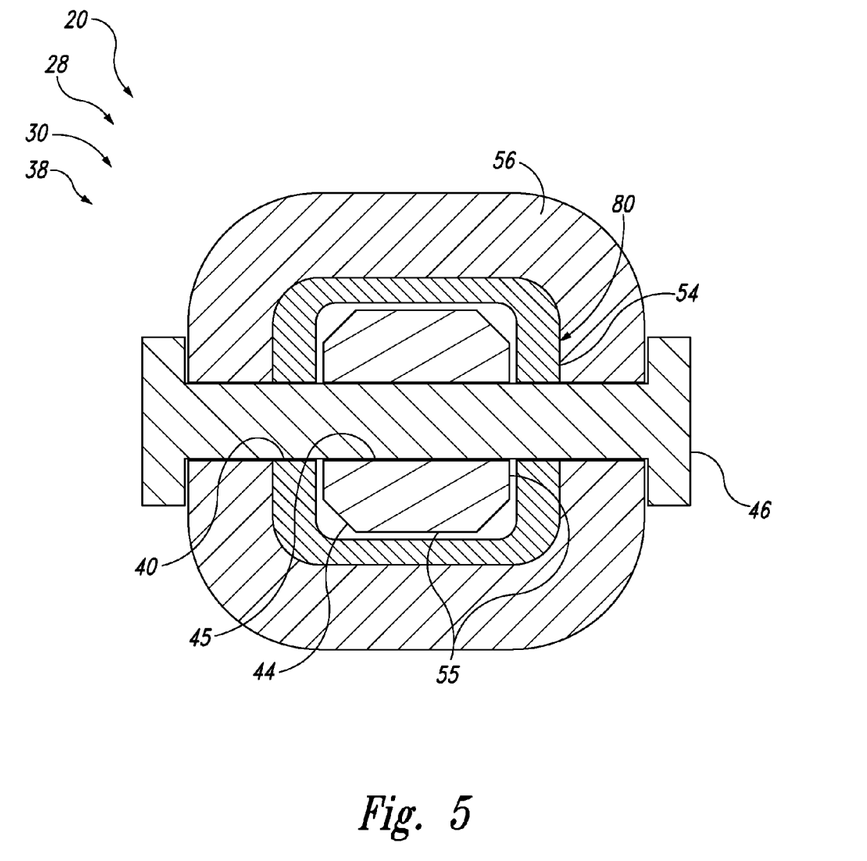
FIG. 5 is a cross sectional, fragmentary view along line 5-5 of FIG. 4, together with an associated fastener.

Composite structures 28 may further comprise a rotational orientation support 54 that is at least radially asymmetric about feathering axis 48 and/or the longitudinal axis of rotor blade 30 that is, or includes, composite structure 28. Rotational orientation support 54 may be used to indicate the rotational orientation of composite structure 28. Rotational orientation support 54 may include orientation features 55 that mate with features on rotor hub 32, trunnion 33, retention mechanism 35, and/or retention strap 44, thus aligning composite structure 28 in a particular rotational orientation relative to the mating feature. Illustrative, non-exclusive example orientation features 55 include a flat, a chamfer, a slot, a pin, and a detent. As an example, FIG. 5 illustrates a slot-shaped opening in a rotational orientation support 54 that mates with a retention strap 44. This example additionally illustrates a fastener 46 projecting through a strap aperture 45 in retention strap 44 and through retention apertures 40 on both sides of composite structure 28.

Rotational orientation support 54 may be an independent component of composite structure 28 or may form a monolithic part with at least one of the bearing supports 50. As illustrated in the example of FIG. 4, rotational orientation support 54 and outboard bearing support 52 may form a monolithic bearing and orientation support 57. If rotational orientation support 54 is generally annular, it may be concentrically aligned along a common axis with the bearing supports 50. Rotational orientation support 54 may be substantially composed of relatively rigid materials such as metal (e.g., steel, aluminum alloy, magnesium alloy, and/or titanium alloy), plastic, and/or fiber reinforced synthetic material.

Components of composite structure 28 that are not radially symmetric about the feathering axis 48 and/or the longitudinal axis of rotor blade 30 that is, or includes, composite structure 28 may be oriented at a predefined angle with respect to the orientation feature 55 of the rotational orientation support 54. Additionally or alternatively, rotational orientation support 54 may form at least a portion of one or more radially asymmetric features of composite structure 28. Radially asymmetric components of composite structure 28 may include airfoil 36, spar 37, root fitting 38, retention mechanism 35, retention aperture 40, and pitch horn 42. Such radially asymmetric components may indicate or be used to describe the orientation of composite structure 28.

Rotor blades 30 are exposed to extreme temperature environments during storage and operation. For example, rotor blades 30 may be subjected to temperatures greater than 50° C. when stored in a hot summer environment. Rotor blades 30 may also be subjected to temperatures less than −40° C. when in flight or in cold winter environments. To accommodate such temperature extremes, rotor blades 30 may be composed of materials with substantially the same coefficient of thermal expansion and/or materials with a low coefficient of thermal expansion. Most structural materials have a coefficient of thermal expansion from about 1-30 ppm/° C. (i.e., for each degree Celsius the linear dimension of the material changes about 1-30 parts per million). Structural materials with a low coefficient of thermal expansion include invar (1 ppm/° C.), titanium alloys (9-13 ppm/° C.), and some iron alloys (10-17 ppm/° C.). Structural materials with a high coefficient of thermal expansion include magnesium alloys (25-28 ppm/° C.) and aluminum alloys (21-25 ppm/° C.). Low coefficients of thermal expansion include less than 20 ppm/° C., less than 15 ppm/° C., less than 12 ppm/° C., less than 10 ppm/° C., less than 8 ppm/° C., and less than 5 ppm/° C.

Composite structures 28 are composed of multiple components, each of which may have a different coefficient of thermal expansion. To avoid thermal stress in composite structure 28, all components, or selected components, may have substantially the same coefficient of thermal expansion. Additionally or alternatively, selected components may be substantially composed of the same material. For example, at least two bearing supports 50 may be composed of substantially the same material. Additionally or alternatively, rotational orientation support 54 may be composed of substantially the same material as at least one bearing support 50. When bearing supports 50 and/or rotational orientation support 54 have substantially the same coefficient of thermal expansion, alignment of bearing supports 50 and/or rotational orientation support 54 may be maintained during operation and storage of the composite structure 28.

Figure 6:
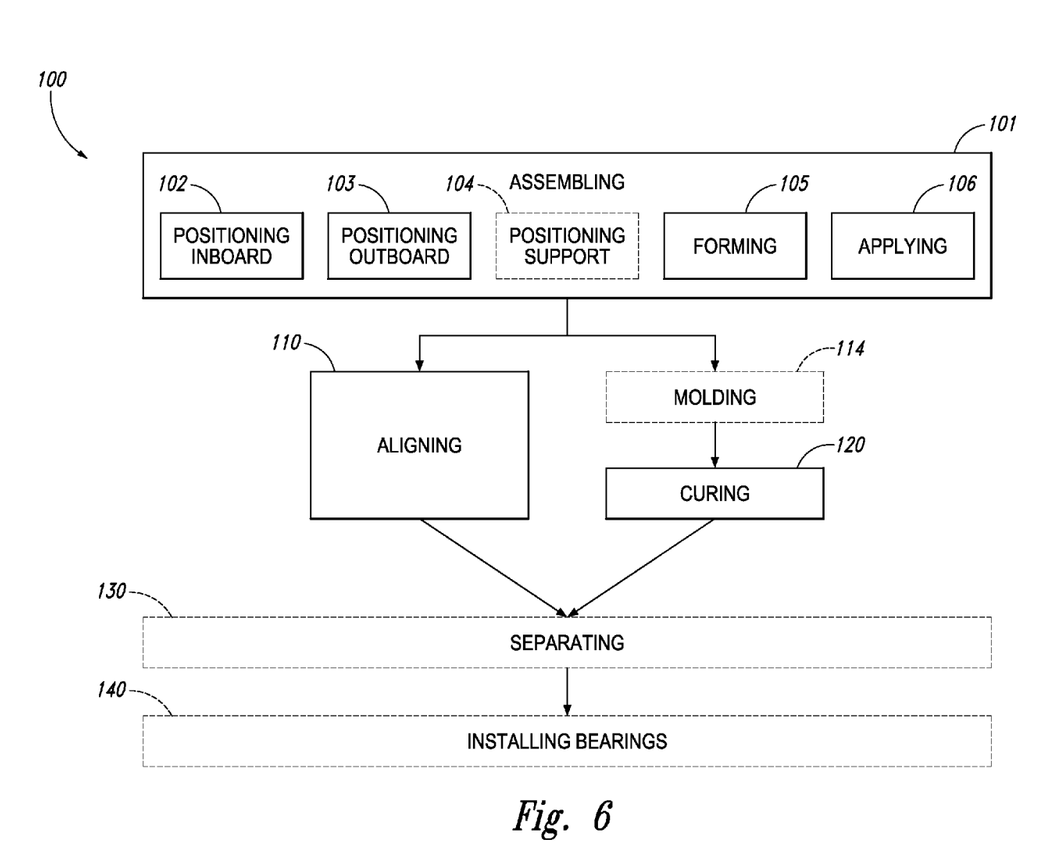
FIG. 6 is a diagram of illustrative, non-exclusive methods of creating a rotor assembly or other composite structure with aligned bearing supports.
Figure 7:
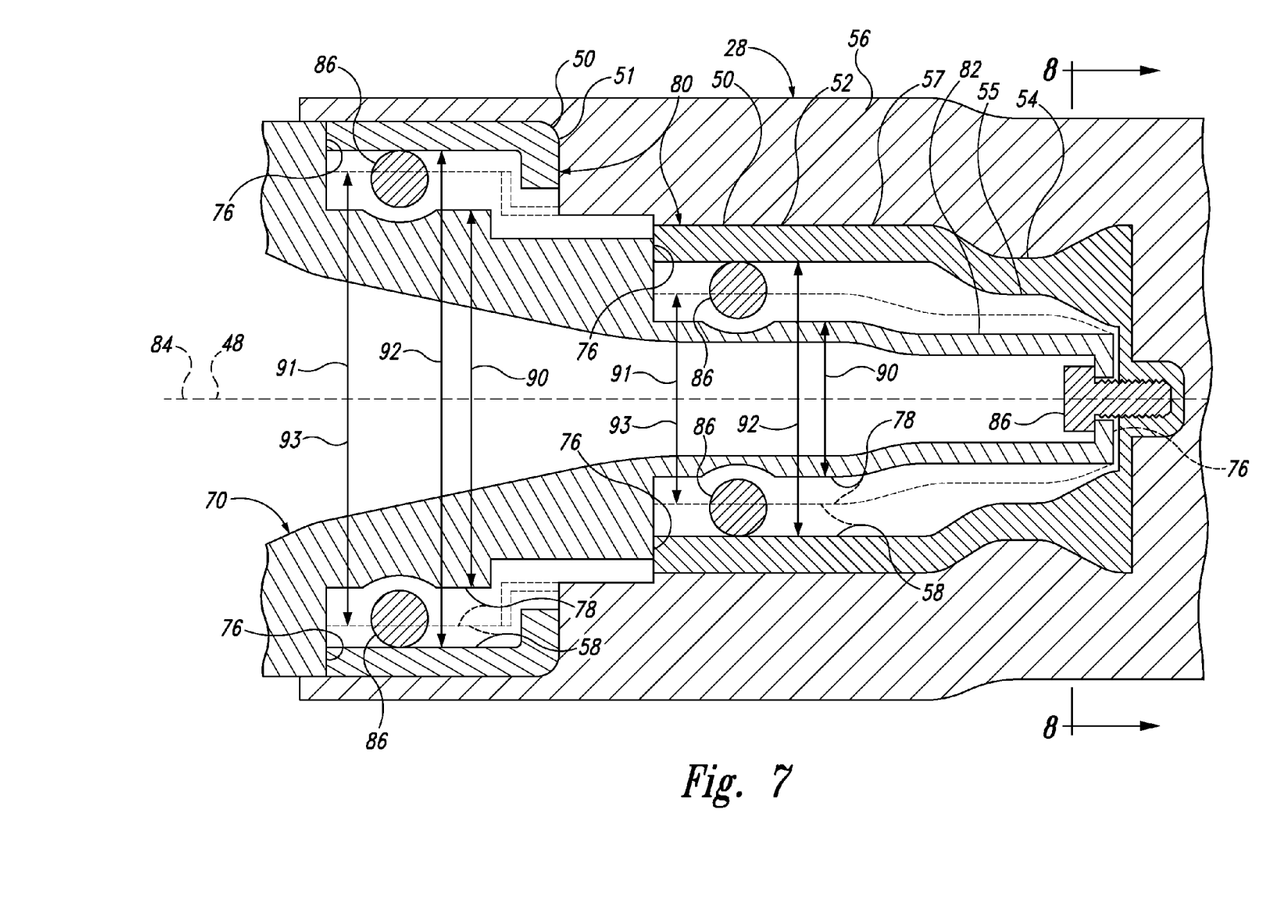
FIG. 7 is a cross sectional, fragmentary view of an illustrative, non-exclusive example of an arbor and composite structure during manufacture.
Figure 8:
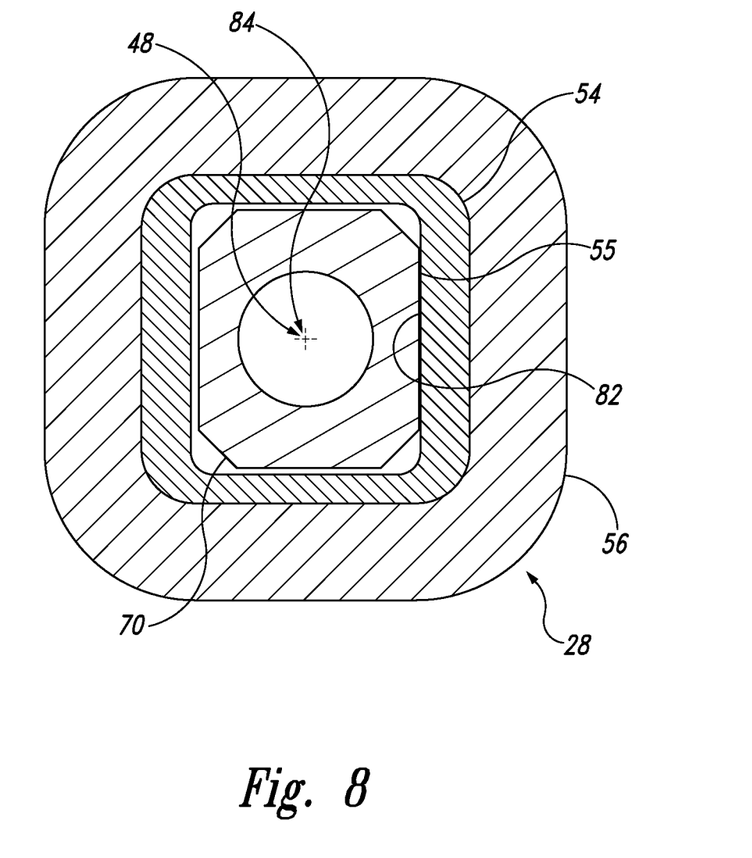
FIG. 8 is a cross sectional view along line 8-8 of FIG. 7.

Turning to FIGS. 6-8, composite structures 28 may be manufactured by following manufacturing methods 100. As schematically represented in FIG. 6, manufacturing method 100 may include assembling 101 the components of a composite structure, aligning 110 the components, and curing 120 the assembled structure. In FIG. 6, optional actions are represented by dotted lines, though use of solid lines does not imply that an action is required in every embodiment. Composite structures 28 include a tubular region with at least two discrete components 80 which need to be aligned in the finished composite structure 28. Discrete components 80 may be one or more of bearing support 50, rotation orientation support 54, and monolithic bearing and orientation support 57. Each discrete component 80 may be located inboard or outboard relative to the composite structure 28.

Composite structures 28 may be manufactured by assembling 101 discrete components 80 and a fiber reinforced composite material 56 around an arbor 70, concentrically aligning 110 the arbor 70 and the discrete components 80 along a common axis, and curing 120 the uncured composite structure. Concentrically aligning 110 the arbor 70 and the discrete components 80 involves adjusting the temperature of one or more of the arbor 70 and the discrete components 80 such that the arbor 70 differentially expands relative to the discrete components 80 until the arbor 70 and the discrete components 80 form an interference fit. Curing 120 involves changing the uncured, generally malleable, composite structure into a generally rigid structure by the application of one or more curing agents, such as chemical compounds, heat, pressure, light, and other forms of energy. Where curing 120 involves heating the uncured composite structure, the arbor 70 and the discrete components 80 may be selected such that the applied heat consequently aligns 110 the arbor 70 and the discrete components 80.

Assembling 101 may be completed with the aid of an arbor 70. Assembling 101 includes positioning (at 102, 103, and optionally 104) discrete components 80 along arbor 70, forming 105 reinforcement fiber into a tubular region in contact with discrete components 80, and applying 106 matrix material to the reinforcement fiber. Positioning includes positioning 102 an inboard bearing support, positioning 103 an outboard bearing support, and optionally positioning 104 a rotational orientation support. Positioning 102 an inboard bearing support or positioning 103 an outboard bearing support may inherently include positioning 104 a rotational orientation support, for example, where inboard bearing support 51 or outboard bearing support 52 is an element of monolithic bearing and orientation support 57. Discrete components 80 may be spaced apart along the longitudinal axis of arbor 70 (the arbor axis 84).

Where discrete components 80 are annular, or at least generally annular, the annular components may be positioned (at 102, 103, and/or optionally 104) around arbor 70. Arbor 70 includes one or more alignment surfaces 78 configured to receive the annular components in a clearance fit, i.e., the clearance-fit inner diameter 92 of the annular component is greater than the clearance-fit outer diameter 90 of alignment surface 78 proximate to the annular component. For example, a clearance fit may occur when the difference in diameters is at least 0.01 mm, at least 0.02 mm, at least 0.05 mm, at least 0.1 mm, at least 0.2 mm, at least 0.5 mm, at least 1 mm, at least 2 mm, or at least 5 mm. Deviations from perfect circularity, including surface roughness, may impact the dimensions required for a clearance fit. Individual alignment surfaces 78 may be on the inboard side of arbor 70 or on the outboard side of arbor 70.

Typically, alignment surfaces 78 of arbor 70 are generally cylindrical, optionally substantially cylindrical, and may be frusto-conical. Each alignment surface 78 may have substantially no taper, or draft, e.g., the draft angle may be less than 0.5°, less than 0.3°, less than 0.2°, or less than 0.1°. When alignment surface 78 does have a taper, the draft angle may be about 0.5°, about 1°, about 1.5°, about 2°, about 3°, or about 5°.

Arbor 70 may include one, two, or more axial locating features 76, with each axial locating feature 76 configured to receive and/or align at least one discrete component 80 along arbor axis 84. Where arbor 70 includes an axial locating feature 76, positioning (at 102, 103, and/or optionally 104) may include positioning a discrete component 80 relative to axial locating feature 76, mating discrete component 80 to axial locating feature 76, and/or placing discrete component 80 in contact with axial locating feature 76. Illustrative, non-exclusive example axial locating features 76 include a shoulder, a hole, a protrusion, a detent, a groove, and a ridge. Axial locating features 76 generally have a portion transverse to arbor axis 84; the portion may be perpendicular or substantially perpendicular to arbor axis 84. Individual axial locating features 76 may be on the inboard side of arbor 70 or on the outboard side of arbor 70.

Positioning (at 102, 103, and/or optionally 104) also may include temporarily affixing discrete components 80 to arbor 70 such that discrete components 80 are not disturbed during the manufacture of composite structure 28. Temporary affixation may be achieved using an affixing mechanism 86 such as an O-ring, a fastener, and/or an adhesive.

Assembling 101 includes creating a fiber reinforced composite material 56 by forming 105 reinforcement fiber into a shape and applying 106 matrix material to the reinforcement fiber. Forming 105 includes forming a tubular region (to create a tubular region of composite structure 28) and may include forming other shapes for other regions of composite structure 28 (e.g., a flat surface for airfoil 36).

Generally, composite materials 56 may be created following pre-preg, wet layup, and infusion techniques (i.e., applying 106 matrix material before, during, or after forming 105 the fiber into a shape). Pre-preg techniques use fiber cloth and/or mat impregnated with matrix material prior to forming the fiber into the desired shape. Typically, the matrix material is partially cured (sometimes described as staged) after impregnation of the fiber, to create a pre-preg stock. For example, epoxy resin may be staged by removing the majority of solvent using heat or light. Though partially cured to assist handling, pre-preg stock is in an uncured state. Complete cure may require application of one or more curing agents, such as chemical compounds, heat, pressure, light and other forms of energy. Pre-preg stock thus needs to be stored in the absence of any curing agent. For example, when curing occurs by heating, pre-preg must be stored cold.

Wet layup techniques generally involve laying dry fiber on a form, such as arbor 70, wetting the dry fiber with uncured matrix material, at least partially curing the wetted fiber, and then repeating with a subsequent layer on top of the preceding layer. As with the pre-preg stock, partially cured, wetted fiber is still in an uncured state. Complete cure may require time (if the matrix material is in process of chemically curing when used to wet the fiber), or may require further curing agents.

Infusion techniques (sometimes called resin transfer molding) generally involve laying dry fiber on a form, such as arbor 70, until the desired shape is achieved. Next, the dry fiber is sealed, for example, by vacuum bagging (sealing a flexible sheet over the dry fiber) and/or by rigid molds. Next, liquid matrix material is injected into the sealed fiber. Generally, vacuum is applied to the dry fiber prior to and/or during the injection to assist complete distribution of matrix material within the fiber.

Forming 105 the reinforced fiber may include placing fiber tow, fiber cloth, and/or fiber mat, around arbor 70 and/or discrete components 80. Such placing may include knitting, braiding, stitching, layering, laminating, and wrapping.

Curing 120 an uncured composite structure transforms the generally malleable uncured structure into a generally rigid cured structure. Curing 120 may involve polymerization and/or cross linking of a matrix material and may require application of one or more curing agents, such as chemical compounds, heat, pressure, light, and other forms of energy. Curing agents may be applied once or may be applied for a period of time. For example, epoxy may be cured by heating the uncured epoxy in a temperature controlled oven to greater than 50° C., greater than 80° C., greater than 100° C., greater than 120° C., greater than 150° C., greater than 180° C., or greater than 200° C. for more than 0.5 hours, more than 1 hour, more than 2 hours, more than 3 hours, more than 4 hours, or more than 8 hours.

Curing 120 may be performed at least partially concurrently with assembling 101, and/or aligning 110. Curing 120 may use vacuum and/or pressure to compact the reinforcement fiber and/or to remove air pockets from the uncured composite structure.

Optionally, manufacturing method 100 may include molding 114 the uncured composite structure. Molding 114 generally includes using a rigid form to define and/or impress a shape to the malleable uncured structure. Molding 114 may be performed at least partially concurrently with assembling 101, aligning 110, and/or curing 120. Molding 114 may include application of heat and/or pressure. Molding 114 may include vacuum molding in which a flexible membrane is sealed around at least part of the uncured composite structure and then a vacuum applied to the sealed volume. In doing so, atmospheric pressure is applied to the malleable composite structure.

Aligning 110 may include heating arbor 70, with selected annular components (such as bearing supports 50 and/or rotational orientation support 54) assembled on it, such that differential expansion of arbor 70 and the selected components causes an interference fit between arbor 70 and the selected components. Additionally or alternatively, aligning 110 may include cooling the selected components such that differential expansion (contraction) of arbor 70 and the selected components causes an interference fit between arbor 70 and the selected components. When arbor 70 and the selected components are heated together, differential expansion will occur if arbor 70 has a greater, optionally significantly greater, coefficient of thermal expansion than any of the selected components. When arbor 70 and the selected components are cooled together, differential expansion (contraction) will occur if arbor 70 has a lesser, optionally significantly lesser, coefficient of thermal expansion than any of the selected components.

When arbor 70 has a different coefficient of thermal expansion than a selected component, suitable differences are greater than 2 ppm/° C., greater than 5 ppm/° C., greater than 10 ppm/° C., and greater than 15 ppm/° C. Where arbor 70 has a greater coefficient of thermal expansion than a selected component, arbor 70 may have a high coefficient of thermal expansion, for example, greater than 10 ppm/° C., greater than 12 ppm/° C., greater than 15 ppm/° C., greater than 20 ppm/° C., or greater than 25 ppm/° C. Additionally or alternatively, selected components may have a low coefficient of thermal expansion, for example, less than 20 ppm/° C., less than 15 ppm/° C., less than 12 ppm/° C., less than 10 ppm/° C., less than 8 ppm/° C., or less than 5 ppm/° C. Where arbor 70 has a lesser coefficient of thermal expansion than a selected component, arbor 70 may have a low coefficient of thermal expansion and/or the selected component may have a high coefficient of thermal expansion.

Upon appropriate heating and/or cooling, the selected components fit around arbor 70 with an interference fit, i.e., the interference-fit inner diameter 93 of the selected component is nominally equal to, or less than, the interference-fit outer diameter 91 of alignment surface 78 proximate to the selected component. For example, an interference fit may occur when the difference in diameters is less than 0.05 mm, less than 0.02 mm, less than 0.01 mm, less than 0.005 mm, less than 0.002 mm, or less than 0.001 mm. An interference fit may occur when the inner surface of the selected component substantially contacts alignment surface 78 of arbor 70. Deviations from perfect circularity, including surface roughness, may impact the dimensions required for an interference fit. Where optional affixing mechanism 86 is interposed between arbor 70 and the selected component, an interference fit may be achieved without contact between the inner surface of the selected component and alignment surface 78 of arbor 70. The interference fit would occur as above by comparing the effective arbor outer diameter, the outer diameter of alignment surface 78 plus the net diametrical thickness of affixing mechanism 86, to the selected component inner diameter.

Upon sufficient heating and/or cooling of arbor 70 and/or the selected components, the differential expansion of arbor 70 with respect to the components results in an interference fit. When arbor 70 has features that are concentric and aligned along a common axis, and the selected components are placed in proximity to those features, the resultant alignment of the selected components will be concentric along a common axis, i.e., the selected components will be aligned to each other as substantially precise as the alignment of the arbor features. In this fashion, precisely toleranced selected components may be aligned to arbor 70, and thus to each other, despite being spaced apart along arbor 70. For example, where arbor 70 is substantially cylindrically symmetric and the selected components are substantially annular, arbor axis 84 will become the common axis of the aligned group (arbor 70 and the selected components). Further, the selected components will be aligned concentrically along arbor axis 84.

Where curing 120 involves heating composite structure 28, arbor 70 and the selected components may be designed such that the applied heat consequently aligns 110 arbor 70 and the selected components. For example, arbor 70 may have a coefficient of thermal expansion sufficiently greater than that of the selected components to allow the applied heat of curing 120 to expand arbor 70 into an interference fit with each selected component.

Optionally, manufacturing method 100 may include separating 130 arbor 70 from composite structure 28 after curing 120. Separating 130 may include ejecting composite structure 28 with mechanical mechanisms, for example pressurized gas. Where arbor 70 has a coefficient of thermal expansion greater than that of the selected components, separating arbor 70 may be accomplished by sufficiently cooling arbor 70, allowing differential expansion (contraction) to shrink arbor 70 such that the interference fit with the selected components no longer exists. Where arbor 70 has a coefficient of thermal expansion less than that of the selected components, separating arbor 70 may be accomplished by sufficiently heating the selected components, allowing differential expansion to grow the selected components such that the interference fit with arbor 70 no longer exists. Typically, curing processes and molding processes create intimate contact between the form and the cured and/or molded part. Release of the part is facilitated by incorporating a taper, or draft, into the form. By heating and/or cooling to alleviate the interference fit as described above, no taper is required to separate composite structure 28 from arbor 70. Hence, alignment surfaces 78 of arbor 70 may be substantially cylindrical and/or incorporate draft angles of less than 0.5°, less than 0.3°, less than 0.2°, or less than 0.1°.

Arbor 70 may include an arbor feature 82 to indicate the rotational orientation of arbor 70. Illustrative, non-exclusive example arbor features 82 include a flat, a chamfer, a slot, a pin, and a detent. Arbor feature 82 may be used as a reference point to create a composite structure feature at a predefined angle. Hence, the composite structure feature may be used to indicate the rotational orientation of composite structure 28. Illustrative, non-exclusive example composite structure features include a flat, a chamfer, a slot, a pin, a detent, airfoil 36, spar 37, root fitting 38, retention mechanism 35, retention aperture 40, and pitch horn 42.

Additionally or alternatively, rotational orientation of arbor 70 and/or composite structure 28 may be indicated by an orientation feature 55 on a rotational orientation support 54. Assembling 101 may include positioning 104 a rotational orientation support 54 proximate to arbor 70. Forming 105 may include forming the fiber into a region, optionally a tubular region, in contact with rotational orientation support 54. Orientation feature 55 may be positioned in proximity to arbor feature 82, optionally in contact with arbor feature 82. Orientation feature 55 may be used as a reference point to create a composite structure feature at a predefined angle. Hence, the composite structure feature would indicate the rotational orientation of composite structure 28. Illustrative, non-exclusive example composite structure features include a flat, a chamfer, a slot, a pin, a detent, airfoil 36, spar 37, root fitting 38, retention mechanism 35, retention aperture 40, and pitch horn 42.

Arbor 70 may be a solid structure rigid enough to establish and/or maintain a concentric, common axis during aligning 110, during curing 120, and/or during molding 114. To achieve this goal, arbor 70 may be a monolithic structure and may be substantially composed of metal, such as aluminum alloy, magnesium alloy, steel, iron alloy, and/or titanium alloy.

Optionally, manufacturing method 100 may include installing 140 bearings in composite structure 28 after curing 120. Pitch bearings 60 are generally fit against the radially inward side of bearing supports 50. Installing 140 bearings may include positioning, assembling, inserting, pressing, and/or mating at least one pitch bearing 60 in contact with at least one bearing support 50. Typically, inboard pitch bearing 61 is installed in contact with inboard bearing support 51 and outboard pitch bearing 62 is installed in contact with outboard bearing support 52. Pitch bearings 60 may be detachably installed, allowing pitch bearings 60 to be removed and replaced without damaging bearing supports 50 and/or composite structure 28. Additionally or alternatively, pitch bearings 60 may be detachably secured in composite structure 28. In certain cases, pitch bearings 60 may be installed, removed and/or replaced without the use of heavy machinery or machine cutting operations (e.g., line boring).

Illustrative, non-exclusive examples of inventive subject matter according to the present disclosure are described in the following paragraphs.

One example of the present disclosure relates to a method of co-curing aligned annular supports in a tubular region of a composite structure. In this example, the method comprises assembling an uncured composite structure. The assembling includes positioning an inboard annular support around an arbor, positioning an outboard annular support around the arbor, forming reinforcement fiber into a tubular region in contact with the inboard annular support and the outboard annular support, and applying a matrix material to the reinforcement fiber. In this example, the method also includes concentrically aligning the arbor, the inboard annular support, and the outboard annular support along a common axis by applying heat to cause differential expansion of the arbor and the inboard annular support, and to cause differential expansion of the arbor and the outboard annular support. The differential expansion causes an interference fit of the inboard annular support against the arbor and an interference fit of the outboard annular support against the arbor. In this example, the method also comprises curing the uncured composite structure to form the composite structure.

In another example, which also includes the subject matter of the preceding example, the composite structure is at least a portion of at least one of a rotor blade root fitting, a rotor blade spar, and a rotor blade.

In another example, which may include the subject matter of any of the preceding examples, the method further comprises separating the arbor from the composite structure after the curing.

In another example, which also includes the subject matter of the preceding example, the separating includes cooling the arbor.

In another example, which may include the subject matter of any of the preceding examples, the arbor includes an inboard locating feature, and the positioning the inboard annular support includes positioning the inboard annular support relative to the inboard locating feature.

In another example, which also includes the subject matter of the preceding example, the positioning the inboard annular support includes mating the inboard annular support to the inboard locating feature.

In another example, which may include the subject matter of any of the preceding examples, the arbor includes an inboard shoulder, and the positioning the inboard annular support includes positioning the inboard annular support in contact with the inboard shoulder.

In another example, which also includes the subject matter of the preceding example, the arbor has an arbor axis, and the inboard shoulder is substantially perpendicular to the arbor axis.

In another example, which may include the subject matter of any of the preceding examples, the arbor includes an outboard locating feature, and the positioning the outboard annular support includes positioning the outboard annular support relative to the outboard locating feature.

In another example, which also includes the subject matter of the preceding example, the positioning the outboard annular support includes mating the outboard annular support to the outboard locating feature.

In another example, which may include the subject matter of any of the preceding example, the arbor includes an outboard shoulder, and the positioning the outboard annular support includes positioning the outboard annular support in contact with the outboard shoulder.

In another example, which also includes the subject matter of the preceding example, the arbor has an arbor axis, and the outboard shoulder is substantially perpendicular to the arbor axis.

In another example, which may include the subject matter of any of the preceding examples, the positioning an inboard annular support includes positioning the inboard annular support proximate to an inboard alignment surface of the arbor, and the inboard alignment surface is substantially cylindrical.

In other examples, which also include the subject matter of the preceding example, the inboard alignment surface has a draft angle less than 0.5°, less than 0.3°, less than 0.2°, or less than 0.1°.

In another example, which may include the subject matter of any of the preceding examples, the positioning an outboard annular support includes positioning the outboard annular support proximate to an outboard alignment surface of the arbor, and the outboard alignment surface is substantially cylindrical.

In other examples, which also include the subject matter of the preceding example, the outboard alignment surface has a draft angle less than 0.5°, less than 0.3°, less than 0.2°, or less than 0.1°.

In another example, which may include the subject matter of any of the preceding examples, the arbor includes an arbor feature to indicate the rotational orientation of the arbor.

In another example, which also includes the subject matter of the preceding example, the method further comprises forming a composite structure feature that indicates the rotational orientation of the composite structure, wherein the composite structure feature is at a predefined angle with respect to the arbor feature.

In another example, which may include the subject matter of any of the two preceding examples, the method further comprises forming an airfoil on the composite structure at a predefined angle with respect to the arbor feature.

In another example, which may include the subject matter of any of the three preceding examples, the method further comprises forming an aperture through the composite structure at a predefined angle with respect to the arbor feature.

In another example, which may include the subject matter of any of the four preceding examples, the method further comprises forming a pitch horn on the composite structure at a predefined angle with respect to the arbor feature.

In another example, which may include the subject matter of any of the preceding examples, the arbor is substantially composed of metal.

In another example, which may include the subject matter of any of the preceding examples, the arbor includes aluminum alloy.

In another example, which may include the subject matter of any of the preceding examples, the arbor is a monolithic structure.

In another example, which may include the subject matter of any of the preceding examples, the arbor is sufficiently rigid to maintain the common axis during the curing step.

In another example, which may include the subject matter of any of the preceding examples, the arbor has a high coefficient of thermal expansion, optionally wherein the arbor coefficient of thermal expansion is greater than 10 ppm/° C., greater than 12 ppm/° C., greater than 15 ppm/° C., greater than 20 ppm/° C., or greater than 25 ppm/° C.

In another example, which may include the subject matter of any of the preceding examples, the inboard annular support has a low coefficient of thermal expansion, and optionally the inboard annular support coefficient of thermal expansion is less than 20 ppm/° C., less than 15 ppm/° C., less than 12 ppm/° C., less than 10 ppm/° C., less than 8 ppm/° C., or less than 5 ppm/° C.

In another example, which may include the subject matter of any of the preceding examples, the outboard annular support has a low coefficient of thermal expansion, and optionally the outboard annular support coefficient of thermal expansion is less than 20 ppm/° C., less than 15 ppm/° C., less than 12 ppm/° C., less than 10 ppm/° C., less than 8 ppm/° C., or less than 5 ppm/° C.

In another example, which may include the subject matter of any of the preceding examples, a coefficient of thermal expansion of the arbor is greater, and optionally significantly greater, than a coefficient of thermal expansion of the inboard annular support and greater, and optionally significantly greater, than a coefficient of thermal expansion of the outboard annular support.

In another example, which may include the subject matter of any of the preceding examples, a difference between a coefficient of thermal expansion of the arbor and a coefficient of thermal expansion of the inboard annular support is greater than 2 ppm/° C., greater than 5 ppm/° C., greater than 10 ppm/° C., or greater than 15 ppm/° C.

In another example, which may include the subject matter of any of the preceding examples, a difference between a coefficient of thermal expansion of the arbor and a coefficient of thermal expansion of the outboard annular support is greater than 2 ppm/° C., greater than 5 ppm/° C., greater than 10 ppm/° C., or greater than 15 ppm/° C.

In another example, which may include the subject matter of any of the preceding examples, the inboard annular support is substantially composed of metal.

In another example, which may include the subject matter of any of the preceding examples, the inboard annular support includes titanium alloy.

In another example, which may include the subject matter of any of the preceding examples, the outboard annular support is substantially composed of metal.

In another example, which may include the subject matter of any of the preceding examples, the outboard annular support includes titanium alloy.

In another example, which may include the subject matter of any of the preceding examples, the inboard annular support and the outboard annular support are substantially composed of the same material.

In another example, which may include the subject matter of any of the preceding examples, the inboard annular support includes an inner surface with a draft angle less than 0.5°, less than 0.3°, less than 0.2°, or less than 0.1°.

In another example, which may include the subject matter of any of the preceding examples, the outboard annular support includes an inner surface with a draft angle less than 0.5°, less than 0.3°, less than 0.2°, or less than 0.1°.

In another example, which may include the subject matter of any of the preceding examples, the assembling further comprises positioning a rotational orientation support proximate to the arbor, the rotational orientation support includes an orientation feature, and the forming includes forming the reinforcement fiber into a tubular region in contact with the rotational orientation support.

In another example, which also includes the subject matter of the preceding example, the method further comprises forming a composite structure feature that indicates the rotational orientation of the composite structure, and the composite structure feature is at a predefined angle with respect to the orientation feature.

In another example, which may include the subject matter of any of the two preceding examples, the method further comprises forming an airfoil on the composite structure at a predefined angle with respect to the orientation feature.

In another example, which may include the subject matter of any of the three preceding examples, the method further comprises forming an aperture through the composite structure at a predefined angle with respect to the orientation feature, and optionally forming an aperture through the rotational orientation support aligned with the aperture through the composite structure.

In another example, which may include the subject matter of any of the four preceding examples, the method further comprises forming a pitch horn on the composite structure at a predefined angle with respect to the orientation feature.

In another example, which may include the subject matter of any of the five preceding examples, the rotational orientation support is substantially composed of metal.

In another example, which may include the subject matter of any of the six preceding examples, the rotational orientation support includes titanium alloy.

In another example, which may include the subject matter of any of the seven preceding examples, the rotational orientation support and the inboard annular support form a monolithic part.

In another example, which may include the subject matter of any of the eight preceding examples, the rotational orientation support and the outboard annular support form a monolithic part.

In another example, which may include the subject matter of any of the preceding examples, the positioning the inboard annular support includes temporarily affixing the inboard annular support to the arbor, and optionally the affixing includes using at least one of an O-ring, a fastener, and an adhesive.

In another example, which may include the subject matter of any of the preceding examples, the positioning the outboard annular support includes temporarily affixing the outboard annular support to the arbor, and optionally the affixing includes using at least one of an O-ring, a fastener, and an adhesive.

In another example, which may include the subject matter of any of the preceding examples, the positioning the inboard annular support includes spacing the inboard annular support apart from the outboard annular support.

In another example, which may include the subject matter of any of the preceding examples, the positioning the outboard annular support includes spacing the outboard annular support apart from the inboard annular support.

In another example, which may include the subject matter of any of the preceding examples, the curing includes heating the uncured composite structure.

In another example, which also includes the subject matter of the preceding example, the heating the uncured composite structure includes the applying heat to cause differential expansion for alignment.

In another example, which may include the subject matter of any of the preceding examples, the curing includes applying a curing agent to the uncured composite structure.

In another example, which may include the subject matter of any of the preceding examples, the method further comprises molding the uncured composite structure, and optionally the molding includes resin transfer molding.

In another example, which also includes the subject matter of the preceding example, the molding includes applying a vacuum to the uncured composite structure.

In another example, which may include the subject matter of any of the preceding examples, the applying step is performed before the forming step.

In another example, which may include the subject matter of any of the preceding examples, the applying step is performed after the forming step.

In another example, which may include the subject matter of any of the preceding examples, the applying step is performed at least partially concurrent with the forming step.

In another example, which may include the subject matter of any of the preceding examples, the reinforcement fiber includes at least one of glass fiber, carbon fiber, and aramid fiber.

In another example, which may include the subject matter of any of the preceding examples, the forming includes placing the fiber around the inboard annular support, the outboard annular support, and the arbor, wherein the placing includes at least one of knitting, braiding, stitching, layering, laminating, and wrapping.

In another example, which may include the subject matter of any of the preceding examples, the method further comprises detachably securing an outboard pitch bearing in contact with the outboard annular support of the composite structure.

In another example, which also includes the subject matter of the preceding example, the outboard pitch bearing includes, and optionally is, one of a bushing, a ball bearing assembly, a roller bearing assembly, and a needle bearing assembly.

In another example, which also includes the subject matter of the preceding example, the outboard pitch bearing includes, and optionally is, a bushing.

In another example, which may include the subject matter of any of the three preceding examples, the outboard pitch bearing includes dry PTFE.

In another example, which may include the subject matter of any of the four preceding examples, the detachably securing includes fitting the outboard pitch bearing radially inward of the outboard annular support.

In another example, which may include the subject matter of any of the preceding examples, the method further comprises detachably securing an inboard pitch bearing in contact with the inboard annular support of the composite structure.

In another example, which also includes the subject matter of the preceding example, the inboard pitch bearing includes, and optionally is, one of a bushing, a ball bearing assembly, a roller bearing assembly, and a needle bearing assembly.

In another example, which also includes the subject matter of the preceding example, the inboard pitch bearing includes, and optionally is, a bushing.

In another example, which may include the subject matter of any of the three preceding examples, the inboard pitch bearing includes dry PTFE.

In another example, which may include the subject matter of any of the four preceding examples, the detachably securing includes fitting the inboard pitch bearing radially inward of the inboard annular support.

Another example of the present disclosure relates to a root fitting formed by the method of any of the preceding examples of methods of co-curing aligned annular supports in a tubular region of a composite structure.

Another example of the present disclosure relates to a rotor blade root fitting formed by the method of any of preceding examples of methods of co-curing aligned annular supports in a tubular region of a composite structure.

Another example of the present disclosure relates to a rotor blade spar formed by the method of any of the preceding examples of methods of co-curing aligned annular supports in a tubular region of a composite structure Another example of the present disclosure relates to a rotor blade formed by the method of any of the preceding examples of methods of co-curing aligned annular supports in a tubular region of a composite structure.

Another example of the present disclosure relates to a rotor assembly that includes the rotor blade of the preceding example, and optionally the rotor assembly is at least one of a main rotor assembly and a tail rotor assembly.

Another example of the present disclosure relates to a rotorcraft including the rotor blade of the preceding example.

Another example of the present disclosure relates to a method of co-curing aligned annular supports in a tubular region of a composite structure. In this example, the method comprises a step for assembling an uncured composite structure. The uncured composite structure includes an inboard annular support, an outboard annular support, and a tubular fiber reinforcement region in contact with the inboard annular support and the outboard annular support. The tubular fiber reinforcement region includes reinforcement fiber and a matrix material. In this example, the method further comprises concentrically aligning an arbor, the inboard annular support, and the outboard annular support along a common axis by applying heat to cause differential expansion of the arbor and the inboard annular support, and to cause differential expansion of the arbor and the outboard annular support. The differential expansion causes an interference fit of the inboard annular support against the arbor and an interference fit of the outboard annular support against the arbor. In this example, the method further comprises curing the uncured composite structure to form the composite structure.

Another example of the present disclosure relates to a rotor blade assembly. In this example, the rotor blade comprises a composite rotor blade with a tubular root fitting including an outboard annular support and an inboard annular support spaced apart from the outboard annular support, the outboard annular support has an outboard inward surface facing radially inward, the inboard annular support has an inboard inward surface facing radially inward, and the outboard inward surface and the inboard inward surface are concentric and aligned along a common axis.

In another example, which includes the subject matter of the preceding example, the rotor blade assembly further comprises an outboard pitch bearing detachably secured in contact with the outboard inward surface.

In another example, which also includes the subject matter of the preceding example, the outboard pitch bearing includes, and optionally is, one of a bushing, a ball bearing assembly, a roller bearing assembly, and a needle bearing assembly.

In another example, which also includes the subject matter of the preceding example, the outboard pitch bearing includes, and optionally is, a bushing.

In another example, which may include the subject matter of any of the three preceding examples, the outboard pitch bearing includes dry PTFE.

In another example, which may include the subject matter of any of the four preceding examples, the outboard pitch bearing is replaceable.

In another example, which may include the subject matter of any of the preceding examples, the rotor blade assembly further comprises an inboard pitch bearing detachably secured in contact with the inboard inward surface.

In another example, which also includes the subject matter of the preceding example, the inboard pitch bearing includes, and optionally is, one of a bushing, a ball bearing assembly, a roller bearing assembly, and a needle bearing assembly.

In another example, which also includes the subject matter of the preceding example, the inboard pitch bearing includes, and optionally is, a bushing.

In another example, which may include the subject matter of any of the two preceding examples, the inboard pitch bearing includes dry PTFE.

In another example, which may include the subject matter of any of the three preceding examples, the inboard pitch bearing is replaceable.

In another example, which may include the subject matter of any of the preceding examples, the outboard pitch bearing and the inboard pitch bearing are concentric and aligned along a common axis.

In another example, which may include the subject matter of any of the preceding examples, the tubular root fitting includes a composite material.

In another example, which may include the subject matter of any of the preceding examples, the inboard annular support is substantially composed of metal.

In another example, which may include the subject matter of any of the preceding examples, the inboard annular support includes titanium alloy.

In another example, which may include the subject matter of any of the preceding examples, the outboard annular support is substantially composed of metal.

In another example, which may include the subject matter of any of the preceding examples, the outboard annular support includes titanium alloy.

In another example, which may include the subject matter of any of the preceding examples, the inboard annular support and the outboard annular support are substantially composed of the same material.

In another example, which may include the subject matter of any of the preceding examples, the inboard annular support has a low coefficient of thermal expansion, optionally the inboard annular support coefficient of thermal expansion is less than 20 ppm/° C., less than 15 ppm/° C., less than 12 ppm/° C., less than 10 ppm/° C., less than 8 ppm/° C., or less than 5 ppm/° C.

In another example, which may include the subject matter of any of the preceding examples, the outboard annular support has a low coefficient of thermal expansion, optionally the outboard annular support coefficient of thermal expansion is less than 20 ppm/° C., less than 15 ppm/° C., less than 12 ppm/° C., less than 10 ppm/° C., less than 8 ppm/° C., or less than 5 ppm/° C.

In another example, which may include the subject matter of any of the preceding examples, the inboard annular support includes an inner surface with a draft angle less than 0.5°, less than 0.3°, less than 0.2°, or less than 0.1°.

In another example, which may include the subject matter of any of the preceding examples, the outboard annular support includes an inner surface with a draft angle less than 0.5°, less than 0.3°, less than 0.2°, or less than 0.1°.

In another example, which may include the subject matter of any of the preceding examples, the composite rotor blade includes a rotational orientation support with an orientation feature.

In another example, which also includes the subject matter of the preceding example, the composite rotor blade includes a blade feature that indicates the rotational orientation of the composite rotor blade, wherein the blade feature is at a predefined angle with respect to the orientation feature.

In another example, which may include the subject matter of any of the two preceding examples, the composite rotor blade includes an airfoil at a predefined angle with respect to the orientation feature.

In another example, which may include the subject matter of any of the three preceding examples, the composite rotor blade includes an aperture through the tubular root fitting at a predefined angle with respect to the orientation feature, and optionally the aperture is through the rotational orientation support.

In another example, which may include the subject matter of any of the four preceding examples, the composite rotor blade includes a pitch horn at a predefined angle with respect to the orientation feature.

In another example, which may include the subject matter of any of the five preceding examples, the rotational orientation support is substantially composed of metal.

In another example, which may include the subject matter of any of the six preceding examples, the rotational orientation support includes titanium alloy.

In another example, which may include the subject matter of any of the seven preceding examples, the rotational orientation support and the inboard annular support form a monolithic part.

In another example, which may include the subject matter of any of the eight preceding examples, the rotational orientation support and the outboard annular support form a monolithic part.

Another example of the present disclosure relates to a rotor assembly including the rotor blade assembly of any of the preceding examples of rotor blade assemblies, and optionally the rotor assembly is at least one of a main rotor assembly and a tail rotor assembly.

Another example of the present disclosure relates to a rotorcraft including the rotor blade assembly of any of the preceding examples of rotor blade assemblies.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of co-curing aligned annular supports in a tubular region of a rotor blade, the method comprising:
    assembling an uncured composite structure, comprising:
        positioning an inboard annular support around an arbor;
        positioning an outboard annular support around the arbor, spaced apart from the inboard annular support;
        positioning a rotational orientation support proximate to the arbor;
        forming reinforcement fiber into a tubular region in contact with the inboard annular support, the outboard annular support, and the rotational orientation support; and
        applying a matrix material to the reinforcement fiber;
    concentrically aligning the arbor, the inboard annular support, and the outboard annular support along a common axis by applying heat to cause differential expansion of the arbor and the inboard annular support, and to cause differential expansion of the arbor and the outboard annular support, wherein the differential expansion causes an interference fit of the inboard annular support against the arbor and an interference fit of the outboard annular support against the arbor;
    curing the uncured composite structure to form the rotor blade, wherein curing includes the applying heat to cause differential expansion; and
    forming an aperture, at a predefined angle with respect to the orientation feature, through the rotor blade and the rotational orientation support.

2. A method of co-curing aligned annular supports in a tubular region of a composite structure, the method comprising:
    assembling an uncured composite structure, comprising:
        positioning an inboard annular support around an arbor, wherein the inboard annular support is substantially composed of metal;
        positioning an outboard annular support around the arbor, wherein the outboard annular support is substantially composed of metal;
        forming reinforcement fiber into a tubular region in contact with the inboard annular support and the outboard annular support; and
        applying a matrix material to the reinforcement fiber;
    concentrically aligning the arbor, the inboard annular support, and the outboard annular support along a common axis by applying heat to cause differential expansion of the arbor and the inboard annular support, and to cause differential expansion of the arbor and the outboard annular support, wherein the differential expansion causes an interference fit of the inboard annular support against the arbor and an interference fit of the outboard annular support against the arbor; and
    curing the uncured composite structure to form the composite structure.

3. The method of claim 2, wherein the curing includes heating the uncured composite structure.

4. The method of claim 3, wherein the heating the uncured composite structure includes the applying heat to cause differential expansion.

5. The method of claim 2, further comprising:
    separating the arbor from the composite structure after curing by cooling the arbor.

6. The method of claim 2, wherein a coefficient of thermal expansion of the arbor is significantly greater than a coefficient of thermal expansion of the inboard annular support and significantly greater than a coefficient of thermal expansion of the outboard annular support.

7. The method of claim 2, wherein the arbor has a coefficient of thermal expansion greater than 20 ppm/° C.

8. The method of claim 2, wherein the arbor includes aluminum alloy.

9. The method of claim 2, wherein the inboard annular support has a coefficient of thermal expansion less than 10 ppm/° C., and wherein the outboard annular support has a coefficient of thermal expansion less than 10 ppm/° C.

10. The method of claim 2, wherein the inboard annular support includes titanium alloy, and wherein the outboard annular support includes titanium alloy.

11. The method of claim 2, wherein the positioning an inboard annular support includes positioning the inboard annular support proximate to an inboard alignment surface of the arbor, wherein the inboard alignment surface is substantially cylindrical,
    wherein the positioning an outboard annular support includes positioning the outboard annular support proximate to an outboard alignment surface of the arbor, and wherein the outboard alignment surface is substantially cylindrical.

12. The method of claim 2, wherein the arbor is sufficiently rigid to maintain the common axis during the curing.

13. The method of claim 2, wherein the arbor includes an inboard shoulder, and wherein the positioning the inboard annular support includes positioning the inboard annular support in contact with the inboard shoulder.

14. The method of claim 2, wherein the arbor includes an outboard shoulder, and wherein the positioning the outboard annular support includes positioning the outboard annular support in contact with the outboard shoulder.

15. The method of claim 2, wherein the positioning the outboard annular support includes spacing the outboard annular support apart from the inboard annular support.

16. The method of claim 2, further comprising:
molding the uncured composite structure by resin transfer molding.

17. The method of claim 2, wherein the assembling further comprises:
positioning a rotational orientation support proximate to the arbor,
wherein the rotational orientation support includes an orientation feature, and wherein the forming includes forming the reinforcement fiber into a tubular region in contact with the rotational orientation support.

18. The method of claim 17, further comprising:
forming an aperture, at a predefined angle with respect to the orientation feature, through the composite structure and the rotational orientation support.

19. The method of claim 17, wherein the rotational orientation support and the outboard annular support form a monolithic part.

20. A method of co-curing aligned annular supports in a tubular region of a composite structure, the method comprising:
assembling an uncured composite structure, comprising:
positioning an inboard annular support around an arbor;
positioning an outboard annular support around the arbor;
forming reinforcement fiber into a tubular region in contact with the inboard annular support and the outboard annular support; and
applying a matrix material to the reinforcement fiber;
concentrically aligning the arbor, the inboard annular support, and the outboard annular support along a common axis by applying heat to cause differential expansion of the arbor and the inboard annular support, and to cause differential expansion of the arbor and the outboard annular support, wherein the differential expansion causes an interference fit of the inboard annular support against the arbor and an interference fit of the outboard annular support against the arbor;
curing the uncured composite structure to form the composite structure;
detachably securing an inboard pitch bearing in contact with the inboard annular support of the composite structure, wherein the inboard pitch bearing is one of a bushing, a ball bearing assembly, a roller bearing assembly, and a needle bearing assembly; and
detachably securing an outboard pitch bearing in contact with the outboard annular support of the composite structure, wherein the outboard pitch bearing is one of a bushing, a ball bearing assembly, a roller bearing assembly, and a needle bearing assembly.

21. The method of claim 20, wherein the inboard pitch bearing includes dry PTFE, and wherein the outboard pitch bearing includes dry PTFE.

22. The method of claim 20, wherein the inboard pitch bearing is substantially composed of metal and wherein the outboard pitch bearing is substantially composed of metal.

* * * * *